(12) United States Patent
Schooling et al.

(10) Patent No.: US 8,021,131 B2
(45) Date of Patent: Sep. 20, 2011

(54) VACUUM PUMP

(75) Inventors: Jennifer Mary Schooling, Hurstpierpoint (GB); Barrie Dudley Brewster, Brighton (GB)

(73) Assignee: Edwards Limited, Crawley, West Sussex (GB)

( * ) Notice: Subject to any disclaimer, the term of this patent is extended or adjusted under 35 U.S.C. 154(b) by 486 days.

(21) Appl. No.: 10/555,462

(22) PCT Filed: Apr. 17, 2004

(86) PCT No.: PCT/GB2004/001756
§ 371 (c)(1),
(2), (4) Date: Oct. 31, 2005

(87) PCT Pub. No.: WO2004/097224
PCT Pub. Date: Nov. 11, 2004

(65) Prior Publication Data
US 2006/0245960 A1 Nov. 2, 2006

(30) Foreign Application Priority Data
Apr. 29, 2003 (GB) .................................. 0309830.8

(51) Int. Cl.
*F04B 35/04* (2006.01)

(52) U.S. Cl. ........... 417/423.12; 417/423.4; 417/423.13; 384/453

(58) Field of Classification Search ............ 384/51, 384/126, 161, 191.4, 228, 452, 453, 454, 384/455; 417/423.12, 423.13, 423.4
See application file for complete search history.

(56) References Cited

U.S. PATENT DOCUMENTS

| 585,574 | A | * | 6/1897 | Higdon | 384/453 |
|---|---|---|---|---|---|
| 1,319,794 | A | * | 10/1919 | Pruyn | 384/453 |
| 2,011,192 | A | * | 8/1935 | Comstock | 384/488 |
| 2,208,724 | A | * | 7/1940 | Griswold | 384/454 |
| 2,436,768 | A | * | 2/1948 | Griffith et al. | 384/453 |
| 3,298,759 | A | * | 1/1967 | Halter | 384/453 |
| 3,302,986 | A | * | 2/1967 | Grolman et al. | 384/452 |
| 3,708,215 | A | * | 1/1973 | Wilcock et al. | 384/102 |
| 4,854,827 | A | * | 8/1989 | McKiernan et al. | 417/313 |
| 4,895,461 | A | * | 1/1990 | Stella | 384/454 |
| 4,971,460 | A | * | 11/1990 | Muntnich et al. | 384/452 |
| 5,139,396 | A | * | 8/1992 | Suzuki et al. | 417/423.4 |

(Continued)

FOREIGN PATENT DOCUMENTS

DE   25 49 700 A   11/1976

(Continued)

OTHER PUBLICATIONS

Abstract of JP2000074080 A, "Vacuum Pump," NTN Corp., Mar. 7, 2000.

(Continued)

*Primary Examiner* — Charles G Freay
*Assistant Examiner* — Todd D Jacobs

(57) ABSTRACT

A vacuum pump (50) includes a pumping arrangement, a shaft (10) for driving the pumping arrangement, a motor (60) for rotating the shaft (10) and a bearing arrangement supporting the shaft (10) for rotation, the bearing arrangement having a rolling bearing (12), supporting a first portion of the shaft (10), and a thrust bearing (30). The thrust bearing (30) houses a plurality of rolling elements (36) such that they are maintained in bearing contact with an outer race (18) of the rolling bearing (12) and a race (34) of the thrust bearing (30). In this way axial movement of the rolling bearing (12) can be resisted whilst allowing radial movement of the rolling bearing (12).

23 Claims, 4 Drawing Sheets

U.S. PATENT DOCUMENTS

| | | | | |
|---|---|---|---|---|
| 5,158,375 | A | * | 10/1992 | Uchida et al. ................ 384/455 |
| 5,417,507 | A | * | 5/1995 | Uno et al. ..................... 384/107 |
| 5,426,988 | A | * | 6/1995 | Ohata et al. ....................... 74/55 |
| 5,469,620 | A | * | 11/1995 | Zinken .................... 29/898.064 |
| 5,522,667 | A | * | 6/1996 | Miyake ......................... 384/492 |
| 5,599,111 | A | * | 2/1997 | Miyazaki et al. ............. 384/512 |
| 5,679,992 | A | * | 10/1997 | Miyamoto et al. ........... 310/90.5 |
| 5,811,903 | A | * | 9/1998 | Ueno et al. ....................... 310/90 |

FOREIGN PATENT DOCUMENTS

| | | | |
|---|---|---|---|
| EP | 1 270 949 | A1 | 1/2003 |
| GB | 580 163 | | 8/1946 |
| GB | 580 166 | | 8/1946 |
| JP | 2000-74080 | A | 3/2000 |
| JP | 2000074080 | A * | 3/2000 |

OTHER PUBLICATIONS

Patent Abstracts of Japan, Hitachi Ltd., "Rotary Shaft Supporting Device of Vertical High-Speed Rotor," Publication No. 62075122, Publication Date Apr. 7, 1987.
Patent Abstracts of Japan, Hitachi Ltd., "Vibration Suppressing Mechanism of High Speed Rotary Machine," Publication No. 62159791, Publication Date Jul. 15, 1987.
Patent Abstracts of Japan, Ebara Corp., "Molecular Turbopump," Publication No. 63255597, Publication Date Oct. 21, 1988.
United Kingdom Search Report of Application No. GB 0309830.8; Date of Search: Nov. 7, 2003.
PCT International Search Report for International Application No. PCT/GB2004/001756; Date of mailing of International Search Report: Jul. 28, 2004.

* cited by examiner

VACUUM PUMP

FIELD OF THE INVENTION

The present invention relates to a bearing arrangement of a vacuum pump.

BACKGROUND OF THE INVENTION

FIG. 2 shows a cross-section of a vacuum pump 50 known hereto which comprises a pumping arrangement driven by a single shaft. The arrangement shown comprises a turbomolecular pumping mechanism 52 and a Holweck pumping mechanism 54, the latter of which is a molecular drag pumping mechanism. The rotors 58 and 59 of the turbomolecular pumping mechanism and the Holweck pumping mechanism, respectively, are arranged to be driven by shaft 56 so that when the shaft is rotated by a motor 60 the shaft drives the pumping arrangement 52, 54. The shaft 56 is supported by a bearing arrangement comprising two bearings which may be positioned either at respective ends of the shaft as shown or alternatively intermediate the ends. In FIG. 2, a rolling bearing 64 supports a first portion of the shaft 56 and a magnetic bearing 62 supports a second portion of the shaft 56. A second rolling bearing may be used as an alternative to the magnetic bearing 62. When magnetic bearings are used it may also be desirable to incorporate a back-up bearing as well known in the art. As discussed in more detail below in relation to FIG. 3, the rolling bearing 64 is provided between the second end portion of the shaft 56 and a housing portion 66 of the pump 50.

With such a pump, it is desirable to allow rolling bearing 64 some movement in the radial direction (radial compliance) but to prevent movement in the axial direction. Any axial movement can lead to clashing between the rotor blades of the turbomolecular pumping mechanism and the stator resulting in pump failure. It is advantageous to allow the radial bearing some radial movement in order to reduce the transfer of vibration from the pump rotor to the pump housing, caused by residual imbalance.

The prior art bearing arrangement will be explained with reference to FIG. 3 which shows an enlarged view of the rolling bearing 64. The rolling bearing comprises an inner race 68 fixed relative to shaft 56, an outer race 70, and a plurality of rolling elements 72, supported by a cage 73, for allowing relative rotation of the inner race and the outer race. The rolling bearing 64 is lubricated to reduce wear on its elements and shield elements 74 are provided to resist seepage of lubricant out of the rolling bearing. The shield may be a separate component, held in place by a spring clip, or other fastener, or alternatively may be an integral part of the bearing outer ring. A radial damping ring 75 is positioned radially between the outer race 70 and the housing portion 66 for damping radial movement of the outer race 70. An axial damping ring 76 is provided between an end face of the outer race 70 and the housing portion 66 which resists axial movement of the outer race but allows radial movement thereof. However, the axial damping ring 76 does not adequately resist axial movement of the outer race because it is, to some extent, compressible in the axial direction and suffers from creep (or compression set) which makes the problem worse over time.

Furthermore, even though a lubricant is used in the rolling bearing 64, due to the potentially high rotation speeds of the pumping arrangement, the rolling bearing increases in temperature during operation. Such an increase in temperature leads to rapid failure of the rolling bearing unless heat can be dissipated from the rolling bearing. A further problem with the prior art arrangement is that the axial damping ring 76 is made from an elastomer which has a low thermal conductivity and is resistant to the passage of heat from the outer race to the housing portion. The housing portion is typically made of Aluminum alloys and can be maintained at a relatively low temperature since such materials have a thermal conductivity in the region of 150 W/mK.

It is desirable to provide an improved vacuum pump.

BRIEF SUMMARY OF THE INVENTION

The present invention provides a vacuum pump comprising: a pumping arrangement; a shaft for driving the pumping arrangement; a motor for rotating the shaft; a bearing arrangement supporting the shaft for rotation, the bearing arrangement comprising: a rolling bearing supporting a first portion of the shaft, and a thrust bearing housing a plurality of rolling elements in bearing contact with an outer race of the rolling bearing and a race of the thrust bearing for resisting axial movement of the rolling bearing and allowing radial movement of the rolling bearing.

The present invention also provides a vacuum pump comprising: a pumping arrangement; a shaft for driving the pumping arrangement; a motor for rotating the shaft; and a bearing arrangement supporting the shaft for rotation, the bearing arrangement comprising: a rolling bearing supporting a first portion of the shaft, and a thrust bearing having a cage spaced from an outer race of the rolling bearing, the cage housing a plurality of rolling elements in bearing contact with the outer race and a race of the thrust bearing for resisting axial movement of the rolling bearing and allowing radial movement of the rolling bearing.

Other preferred aspects of the invention are defined in the accompanying claims.

BRIEF DESCRIPTION OF THE DRAWINGS

In order that the present invention may be well understood, an embodiment thereof, which is given by way of example only, will now be described with reference to the accompanying drawings, in which.

DETAILED DESCRIPTION OF THE INVENTION

Figure 1:
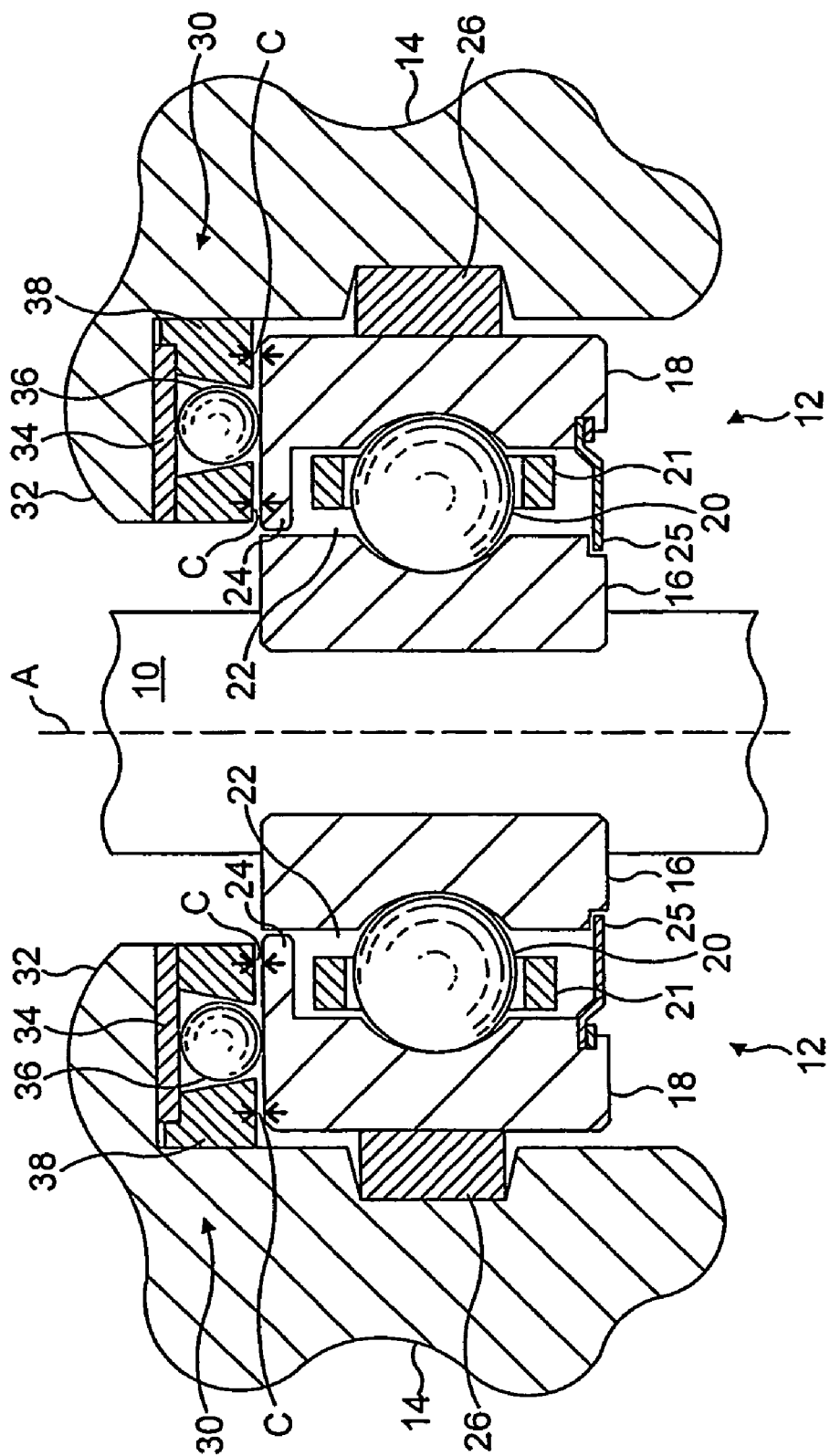
FIG. 1 is an enlarged cross-section showing a rolling bearing of a vacuum pump according to an embodiment of the invention.
Figure 2:
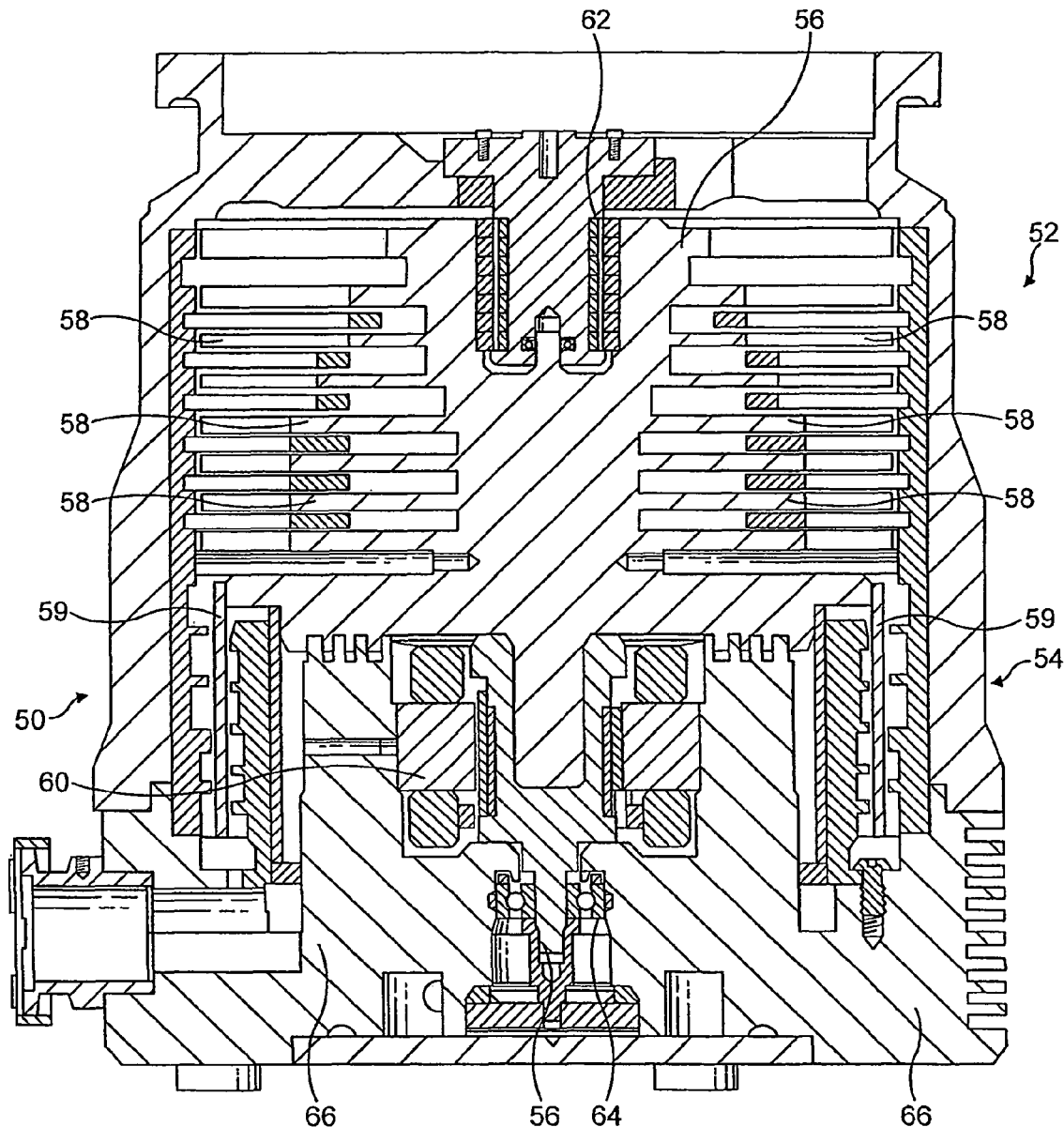
FIG. 2 is a cross-section of a prior art vacuum pump.
Figure 3:
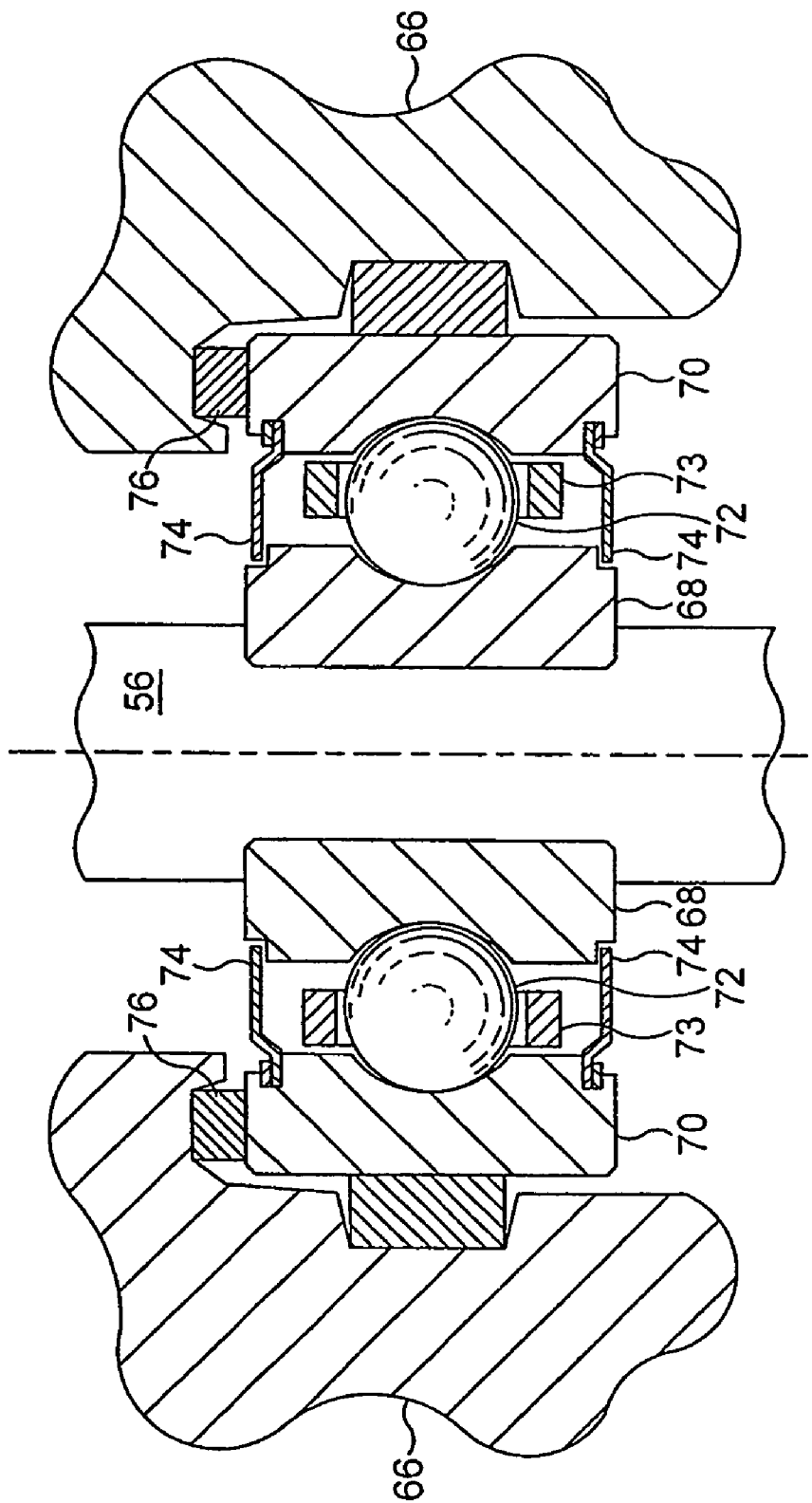
FIG. 3 is an enlarged cross-section showing a rolling bearing of the vacuum pump shown in FIG. 2.
Figure 4:
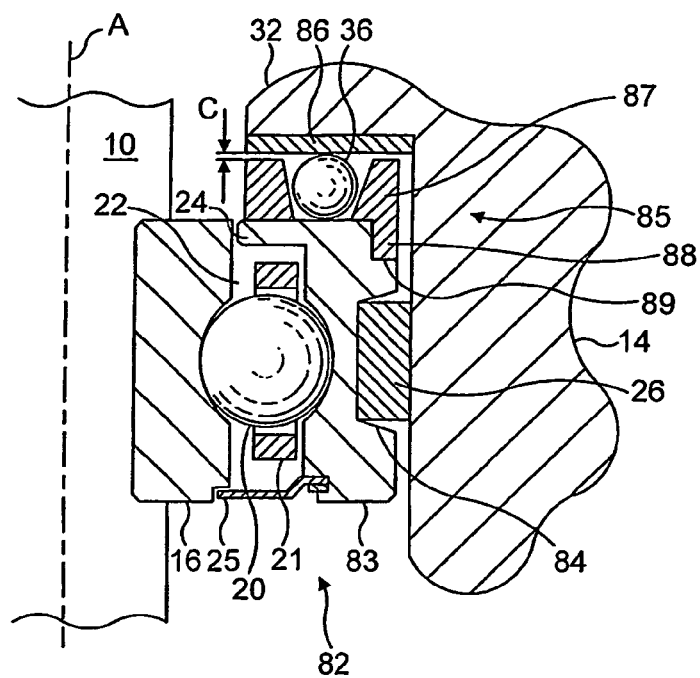
FIG. 4 is a cross section showing a rolling bearing of a vacuum pump according to another embodiment of the invention.
Figure 5:
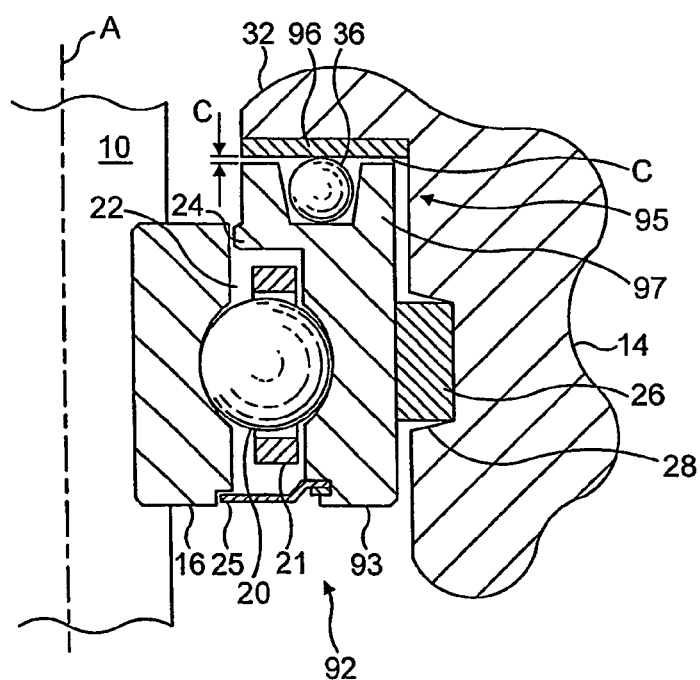
FIG. 5 is a cross section showing a rolling bearing of a vacuum pump according to a third embodiment of the invention.

The embodiments have the general structure shown in FIG. 2 and differ from the prior art only in the structure and mounting of the rolling bearing. For brevity, therefore, only the rolling bearing arrangement shown in FIGS. 1, 4 and 5 are described in detail hereinafter.

Referring to FIG. 1, a vacuum pump comprises a shaft 10 supported by a bearing arrangement. The bearing arrangement comprises a rolling bearing 12 which supports a first portion of the shaft 10 and which is positioned between the shaft 10 and a housing portion 14, in the same way as described with reference to FIG. 2. The arrangement shown in FIG. 1 has rotational symmetry about axis A. The bearing arrangement further comprises a magnetic bearing supporting a second portion of shaft 10 although this is not shown in FIG. 1.

The rolling bearing 12 comprises an inner race 16 fixed relative to the shaft 10, an outer race 18, and a plurality of rolling elements 20, in a cage 21, for allowing relative rotation of the inner race and the outer race. The rolling elements 20 are preferably ball bearings made of high strength steel or ceramic. A lubricant 22, which may for instance be oil or grease, is provided to reduce friction and wear between the moving parts of the bearing 12. A shield, or flange, portion 24 extends radially inwardly from an axial end of the outer race 18 and is integral with the outer race. Alternatively, shield portion 24 may be a separate part. The shield portion resists the seepage of lubricant 22 out of the rolling bearing. A shield element 25 is also provided to resist the seepage of lubricant. A radial damping ring 26 is accommodated in a circumferential recess 28 in the housing portion 14 to resist excessive radial movement of the rolling bearing 12. Alternatively, the damping ring 26 may be accommodated in a circumferential recess in the outer race as exemplified in FIG. 4.

A thrust bearing 30 is positioned between an axial end face of the outer race 18 (including integral shield portion 24) and a shoulder 32 of the housing portion 14. The thrust bearing comprises a race in the form of a disc 34 which is preferably made of a high strength material such as steel and which bears against shoulder 32. A plurality of rolling elements 36 are provided in contact with the disc 34 and the outer race 18 for resisting axial movement of the outer race but allowing relatively free radial movement thereof. The rolling elements 36 are housed in respective pockets in a cage 38 which is fixed relative to the housing portion 14 and disc 34, and spaced from the axial end face of the outer race 18. The rolling elements could alternatively be located within pockets or a circumferential groove formed directly in the outer race 18. The pockets may be formed as cylindrical recesses, each cylinder having its axis parallel to the pump rotational axis. The housing portion 14 is maintained at a relatively low temperature compared to the rolling bearing, since the housing portion is not a moving part, may be cooled and is typically made of a material with high thermal conductivity. Therefore heat readily passes from the cage 38 which is fixed to the housing portion so that the cage is kept at a lower temperature than the rolling bearing 12 when the pump is in use. The assembly is constructed with a small axial clearance between the cage 38 and the outer race 18. This clearance may be filled with oil or grease to create a thermal pathway to conduct heat from the rolling bearing 12 to the thrust race 30. Oil or grease typically has a thermal conductivity in the range 0.10 to 0.16 W/mK.

In the prior art, the typical thermal resistance of the axial damping ring is 18 K/W and the radial damping ring is 65 K/W, giving a net thermal resistance of the bearing mounting of around 14 K/W. According to the embodiment, the thermal resistance may be less than 5 K/W, allowing the rolling bearing to be maintained at a cooler temperature.

The cage 38 is accurately manufactured to produce a small clearance C between it and the end face of the outer race 18, and shield portion 24, to improve the thermal pathway between the rolling bearing 12 and the thrust race 30. Clearance C is less than 0.5 mm, although preferably it is less than 0.37 mm. More preferably, clearance C is less than 0.10 mm. It will be appreciated that the amount of heat which is able to pass from the rolling bearing 12 to the thrust race 30 is approximately inversely proportional to the size of clearance C and therefore a reduction in clearance C, without risking contact between the axial end face of the outer race 18 and the cage 38, increases heat transfer. If a lubricant such as oil or grease is disposed in clearance C, the amount of heat which can be dissipated from the rolling bearing 12 to the thrust race 30 is further increased. By way of example, when the clearance C is in the range of 0.05 to 0.1 mm and filled with oil or grease, the thermal resistance of the bearing mounting is in the range 1.3 to 2.6 K/W.

The cage 38 is made of a material with high thermal conductivity, such as bronze or bronze alloy to reduce thermal resistance along the thermal pathway from the rolling bearing 12 to the thrust race 30. For example, the cage may be made from phosphor bronze which has a thermal conductivity in the range of 50 to 80 W/mK. The shape of the cage 38 (i.e. with a large surface area towards the rolling bearing) decreases thermal resistance. Likewise, the shield portion 24, which may be integral with the outer race 18, increases the surface area of the outer race facing the cage 38 and thus also decreases thermal resistance. The disc 34 and the bearing outer race 18 are preferably made from a high carbon steel such as AISI 52100 high carbon steel which has a thermal conductivity of 46 W/mK.

It will be appreciated from the foregoing that the axial clearance provides greater thermal resistance to the passage of heat away from the rolling bearing than the cage, since the thermal conductivity of oil or grease is about 500 times less than that of phosphor bronze. However, the cage becomes equally influential when it has a thickness of about 5 mm, i.e. about 500 times the thickness of the oil or grease filled clearance.

The contact area between rolling elements 36 and the outer race 18 is small meaning that only a negligible amount of heat can be transferred from the rolling bearing to the thrust bearing by this route and cannot dissipate sufficient heat from the rolling bearing on its own.

A second embodiment of the invention is shown in FIG. 4 where it can be seen that the thrust race 85 is located in contact with the outer race 83 rather than spaced therefrom as in the embodiment shown in FIG. 1. Clearance C is therefore provided at a greater distance from the outer race 83 than in the previous embodiment. Such a configuration provides enhanced thermal conductivity from the outer race 83 to the thrust race cage 87 but reduces thermal conductivity from there to disc 86.

In order to maintain concentricity between the thrust race 85 and the outer race 83 of rolling bearing 82, a shoulder 88 is formed on cage 87 which cooperates with recess 89 in outer race 83.

As discussed above the radial damping ring 26 can be accommodated in a circumferential recess 84 in the outer surface of the outer race 83, such a configuration is illustrated in FIG. 4.

A third embodiment of the invention is illustrated in FIG. 5. Here the cage 97 of thrust race 95 is provided as an integral part of the outer race 93 of rolling bearing 92. Once again clearance C is provided adjacent ring 96, this gap can be packed with lubricant or grease as in earlier embodiments to create a thermal pathway between the rolling bearing 92 and the housing portion 14.

We claim:
1. A vacuum pump comprising:
a pumping arrangement in a pump housing;
a shaft for driving the pumping arrangement;
a motor for rotating the shaft;
a bearing arrangement for supporting the shaft for rotation and having a rolling bearing comprising an outer race formed by a single piece of structure for supporting a first portion of the shaft; and a thrust bearing having a race and a rolling element in contact with the outer race of the rolling bearing and with the race of the thrust bearing for resisting axial movement of the rolling bearing and allowing radial movement of the rolling bearing; and a cage for positioning the rolling element of the thrust bearing therein, wherein the cage is affixed to the pump housing, such that the cage is kept at a lower temperature than that of the rolling bearing when the vacuum pump is in operation, wherein the pumping arrangement includes a turbomolecular pumping mechanism having a rotor attached to the shaft supported by the bearing arrangement, which resists axial movement of the shaft, thereby maintaining a spatial relationship between the rotor and the pump housing in an axial direction.

2. The vacuum pump according to claim 1 wherein the cage is spaced from the outer race of the rolling bearing.

3. The vacuum pump according to claim 1 further comprising a circumferential groove formed in the outer race of the rolling bearing in which the rolling element is located.

4. The vacuum pump as claimed in claim 1 wherein the bearing arrangement further comprises a magnetic bearing supporting a second portion of the shaft.

5. The vacuum pump as claimed in claim 1 wherein the rolling bearing is a ball bearing.

6. The vacuum pump as claimed in claim 1 further including a thermal pathway extending between the rolling bearing to the thrust race for conduction of heat.

7. The vacuum pump as claimed in claim 1 wherein the outer race includes a shield for resisting seepage of lubricant out of the rolling bearing, and a thermal pathway extending between the shield and the cage.

8. The vacuum pump as claimed in claim 7 wherein the shield is integral with the outer race.

9. The vacuum pump as claimed in claim 1 wherein lubricant is disposed in a clearance between an end face of the outer race and the cage.

10. The vacuum pump as claimed in claim 9 wherein the clearance between the end face of the outer race and the cage is less than 0.5 mm.

11. The vacuum pump as claimed in claim 9 wherein the clearance is less than 0.1 mm.

12. The vacuum pump as claimed in claim 1 wherein the cage comprises a material having a high thermal conductivity.

13. The vacuum pump as claimed in claim 12 wherein the cage comprises a material having a thermal conductivity greater than 50 W/mK.

14. The vacuum pump as claimed in claim 1 wherein the cage comprises a bronze material.

15. The vacuum pump as claimed in claim 1 wherein the rolling element comprises a high strength steel material.

16. The vacuum pump as claimed in claim 1 wherein a thermal pathway between the outer race of the rolling bearing and the pump housing has a thermal resistance less than 5 K/W.

17. A vacuum pump comprising:
a housing;
a pumping arrangement in the housing;
a shaft for driving the pumping arrangement;
a motor for rotating the shaft;
a rolling bearing positioned within the housing for supporting the shaft, the rolling bearing comprising an outer race having a shield portion disposed radially inwardly, wherein the shield is an integral part of the outer race in a sense that the shield and the outer race are formed by a single piece of structure;
a thrust bearing positioned between the shield and the housing and comprising a race positioned proximate to a shoulder and a rolling element in contact with the race of the thrust bearing and the shield; and
a cage for positioning the rolling element of the thrust bearing therein, wherein the cage is affixed to the housing, such that the cage is kept at a lower temperature than that of the rolling bearing when the vacuum pump is in operation,
wherein the pumping arrangement includes a turbomolecular pumping mechanism having a rotor attached to the shaft supported by the rolling bearing and the thrust bearing, which resists axial movement of the shaft, thereby maintaining a spatial relationship between the rotor and the housing in an axial direction.

18. The vacuum pump of claim 17 wherein the cage is spaced from the shield to form a clearance.

19. The vacuum pump of claim 17 wherein the housing comprises a material having a high thermal conductivity.

20. The vacuum pump of claim 18 wherein the housing comprises a material having a high thermal conductivity.

21. The vacuum pump of claim 18 wherein the clearance is no more than 0.5 mm.

22. The vacuum pump of claim 18 wherein the clearance is less than 0.1 mm.

23. The vacuum pump of claim 19 wherein the housing comprises a bronze material.

* * * * *